United States Patent Office 3,124,834
Patented Mar. 17, 1964

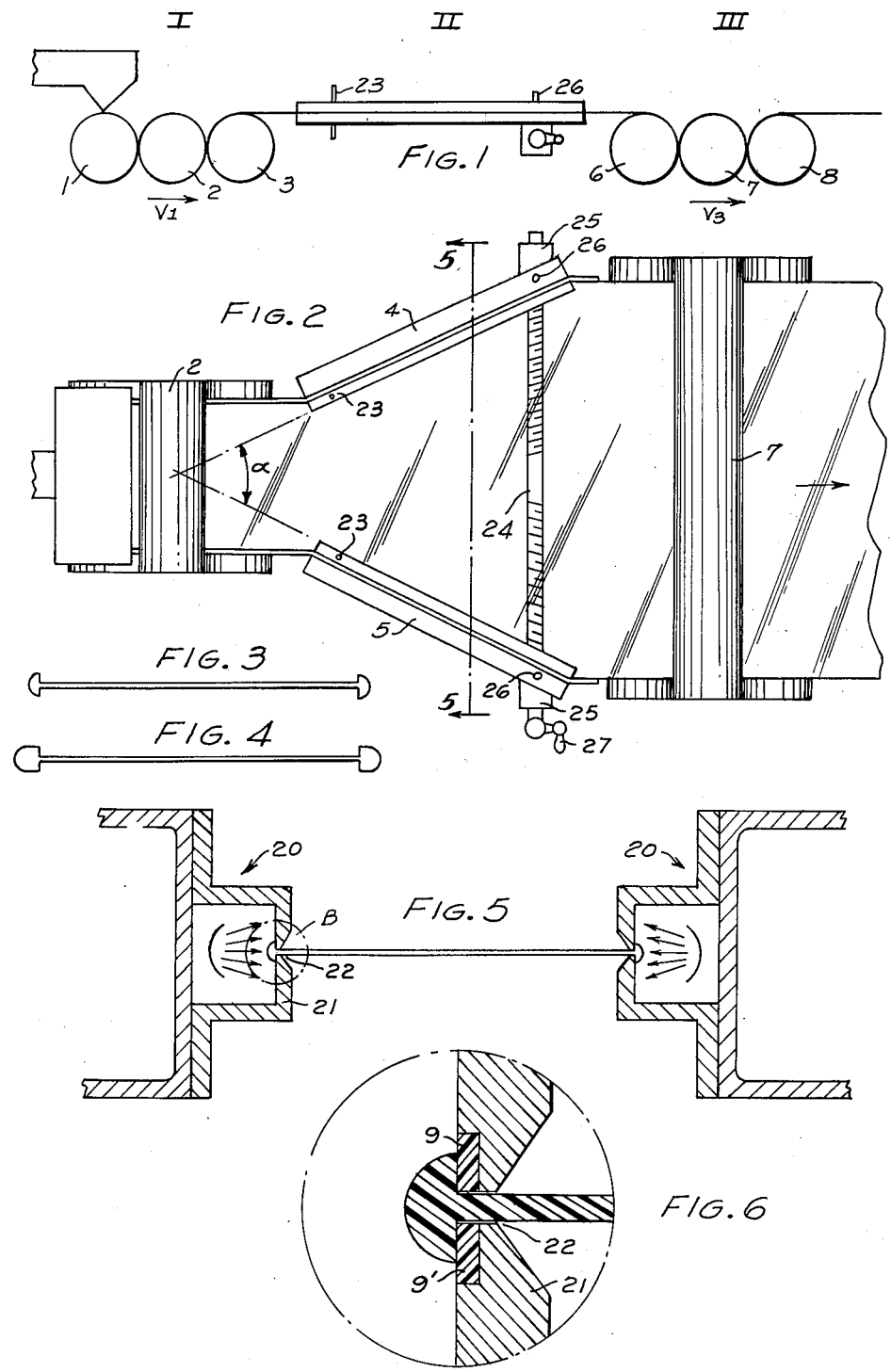

3,124,834
APPARATUS FOR STRETCHING THERMOPLASTIC FILMS WITH BEADED EDGES
Constant Andre Vandierendonck, Borsbeek-Antwerp, Belgium, assignor to Gevaert Photo-Producten N.V., Mortsel-Antwerp, Belgium, a Belgian company
Filed Aug. 16, 1960, Ser. No. 49,991
4 Claims. (Cl. 18—1)

The present invention relates to a new apparatus for stretching thermoplastic films with beaded edges and particularly to the stretching of such films simultaneously in both longitudinal and transverse directions.

It is already known to improve the mechanical properties of sheets and films prepared from thermoplastic material by stretching them longitudinally. This longitudinal stretching increases the strength of the sheet or film, among others the breaking strength. If, however, such a sheet or film is stretched transversely the mechanical properties are reduced. When combining stretching in longitudinal direction together with transverse stretching, sheets and films can be obtained which possess a marked increase in strength in both directions. The stretching of continuously extruded films or sheets is subject to the problem of gripping the edges without exceeding the admitted rate of tensile strength of the sheet or film at the gripping areas.

Although various apparatus have been proposed for obtaining a faultless, transversely and uniformly stretched film, many of these apparatus have proved to be unsatisfactory for, in those areas where the film edge is not supported by gripping devices or guide rollers, shrinkage of the film is formed and the stretched film, after the neutralization of the local stress, is concentrated and buckled in such a way that wrinkling occurs when the film is restretched.

Some of the proposed apparatus are satisfactory but are rather complicated. For example, it is known from the United States Patent 2,728,941 to use an apparatus for simultaneously stretching film in longitudinal and transverse directions, by means of two double series of diverging guide rollers used for conveying the beaded edges of the extruded film. The main drawback of this apparatus resides, besides its expensive construction on account of the numerous guide rollers, also in the necessity of a regular maintenance and control of the apparatus and especially in the occurrence of shrinking each time the film edge is not supported by a guide roller.

Moreover the relative position of the rollers in respect of the film edges is mostly realized in such a way that friction occurs due to the difference in peripherical speeds of the guide rollers and the constant linear speed of the film to be stretched. In case a guiding without friction is wanted the guide rollers have to be positioned in another way, so that when heating is done by means of I.R. radiation, inevitably an amount of the radiation heat, necessary to maintain the temperature of the film at a sufficiently high temperature, is intercepted by these rollers, causing a considerable increase in cutting. When air heating is applied the rollers thus positioned are hindering the regular air distribution which gives rise to local undesirable turbulences.

Now has been found an apparatus for stretching an extruded thermoplastic synthetic film with beaded edges in one or simultaneously in two directions, in a very simple way by conveying the film between feed rollers and afterwards between pull rollers, said pull rollers having a peripherical speed equal to or higher than the peripherical speed of the feed rollers, and by guiding the beaded film edges by means of diverging or parallelly fixed guide members which are positioned between the feed rollers and the pull rollers, said guide members being free from adhering to the beaded edges at stretching temperature.

Hereinafter the new apparatus according to the present invention is schematically described by way of an apparatus for the stretching of continuously extruded thermoplastic film.

With reference to the accompanying drawings:

FIG. 1 is a side view of the zones I, II and III of the apparatus according to the present invention.

FIG. 2 is a top view of this apparatus.

FIGS. 3 and 4 are sectional views of extruded and unstretched filmstrips with beaded edges.

FIG. 5 is a sectional view on the line 5—5 of FIG. 2 in zone II of the apparatus.

FIG. 6 is a detailed section of zone B in FIG. 5.

The polymer used for the preparation of a film is extruded by a commercially available extruder at a higher temperature than the weakening temperature (zone I, FIG. 1). The slit of the extruder head has been fitted in such a way as to give a cross section to the extruded film strip as shown in FIG. 3 or 4. The film is received on the roller 1 in zone I, is cooled down on this roller and on the following rollers 2 and 3 to weakening temperature and is maintained at this temperature, e.g. by keeping the rollers to weakening temperature. This set of rollers is rotating with a peripherical speed $V_1$ which is equal to or higher than the extrusion speed.

When the film is conveyed to zone II of the stretching apparatus, the film edges are forced to move behind the guide members of the frames 4 and 5 (FIG. 2) which react transversely on the film due to their diverging position. The two frames have each an inwardly facing guide box 20 which extends lengthwise of the frames. The vertical inner wall 21 of this guide box has a slot 22 for receiving the thermo-plastic film, the enlarged or beaded edge of the film being engaged by this inner wall. Their angular position can then be adjusted by controlling their opposite ends by any conventional means, here shown as a right- and left-hand threaded screw 24 carrying respective nut elements 25 to which the ends of the frames are pivoted as at 26; the frame ends are thus moved equal amounts toward and away from one another by the crank 27 on the screw shaft. The relative location of these anti-friction guide members 9 and 9′ in respect of the inner wall of guide box 20 in which they are mounted is shown in FIG. 6. The desired width for stretching is determined by adjusting the value of the angle between the guide members. The frames 4 and 5 are pivotable at their inner end, as shown at 23, adjacent the feed rollers. This angle may even be reduced to 0° C. e.g. for the manufacture of magnetic recording tape. In this case, the guide members, positioned in parallel to each other, prevent the film from shrinking owing to the transverse reaction on the film edges.

Preferably the beaded edges are separated from the film after completion of this proper stretching process. Next, the film is conveyed in zone III to the pull rollers 6, 7 and 8, rotating with a peripherical speed $V_3$ which is equal or higher than $V_1$. The difference in speed between the feed rollers 1, 2, 3 and the pull rollers 6, 7 and 8 causes, simultaneously with the transverse stretching by the guide members, a longitudinal stretching, which gives the desired longitudinal stretch to the film in zone II of the apparatus.

According to the case these pull rollers can be replaced by a set of endless chains, mounted in parallel in respect of each other and on which gripping devices are fitted as known in the textile manufacturing industry.

The apparatus according to the present invention is especially suited for the manufacture of films from polystyrene and from polymers which crystallize slowly. The novel apparatus, however, can favourably be applied in the preparation of films composed of all kinds of organic thermoplastic material, such as polyethylene, polyethylene terephthalate, polyvinylchloride, polyvinyl acetate, polyhexamethylene adipamide, polyhexamethylene sebacamide, poly caproamide, polyvinylidene chloride, rubber hydrochloride, cellulose derivatives such as cellulose triacetate and cellulose-acetobutyrate, polycarbonates, polyesters and many other similar materials susceptive of stretching at different temperature.

The new apparatus is also appropriate for the production of polyester sheets from diphenols and dicarboxylic acids as disclosed in the United States patent application Serial No. 702,252, filed December 12, 1957, and for the production of polysulfonates as disclosed in the United States patent application Serial No. 797,587, filed March 6, 1959.

According to their properties the films extruded in this way can be used as wrapping material for widely varying ranges of products and articles, as glass substituting products, as an intermediate layer for safety glass, as insulation for electrical and other material as magnetic recording film, as photographic film support etc.

The feedrollers and the pull rollers are made from any suitable metal or metal alloy provided their surface has carefully been polished and freed from all defects causing inadmissible injuries on the film or sheet. For instance these rollers can be made from steel covered with a thin layer of copper, nickel, chrome, aluminium or the like or an alloy of these metals. The surface of the rollers can also be made from stainless chrome steel, nickel, vanadium or titanium steel or any suitable alloy capable to be polished and resistant to corrosion. Alternatively the surfaces of the second set of rollers i.e. the pull rollers can be covered with organic substances such as butadiene rubber, silicone rubber, etc. resisting to relatively high temperatures and having a sufficiently high friction coefficient. In a preferably applied embodiment according to the apparatus of the present invention the slit of the extruder head and consequently the extruded film, is shaped into a narrow rectangular section having at both sides semicircular or rectangular terminal ends as shown in FIGS. 3 and 4. The thickness of the film edge has to be at least twice the thickness of the film before stretching and usually the film edge possesses a thickness not greater than three times the film thickness. The choice of a greater film edge thickness has to be avoided on account of the additional work for realizing the stretching of such thick film edges, on account of the necessary power supply for maintaining the film edges at weakening temperature, and moreover, on account of the high quantities of cuttings which are not desirable. Preferably twice the film thickness is considered to be the appropriate thickness of the film edges.

The guide members have to be made from a material which, at the stretching temperature, does not adhere to the stretched thermoplastic material. In case the friction coefficient amounts to such a degree that adhering would occur, the steel guide members can be coated with carbon plates or polyfluoroethylene. It is evident that the coatings of the guide members must have a sufficiently high value of heat stability resistance while applying the stretching process.

For the manufacture of some polymer films, such as films from polyethylene terephthalate the temperature of the film edges can successfully be regulated at a lower temperature than the film temperature in order to impart a sufficient mechanical resistance to the film edges during the transverse stretching process.

For this purpose I.R. radiation units are positioned parallel to the film edges as indicated in FIG. 5. If desired these I.R. radiation units may be replaced by channels or tubes through which a heat exchanging fluid or gas circulate. This circulation can also be extended to other constructional parts of the extruder and the stretching apparatus. Suitable heat-exchanging substances are e.g. paraffine and paraffine-containing oils, diphenyl ether, chlorinated diphenyl and naphthalenes, as well as ethylene glycol or water. According to the necessity these substances can be used in gaseous or liquid state. Even hot air can be employed as heat exchanging substance.

In those areas where the film has to be stretched in longitudinal direction the temperature of the extruded film can be raised by means of one or more I.R. radiation units which are closely located to the film.

The most important advantage according to the apparatus of the present invention compared to the prior known apparatus resides in the non-appearance of local shrinking. Faultless and uniform films obtained over long periods by using the described stretching apparatus, is still a further advantage of the present invention. Furthermore the stretching apparatus is relatively small, constructed in a simple and economical way and consequently not expensive. Moreover it requires a restricted maintenance and control. The following examples illustrate the apparatus without however, limiting the scope thereto.

*Example 1*

Polystyrene (weakening point 95° C.) is weakened and homogenized in a usual 30 mm. extruder, the roller temperature of which is maintained at 200° C. by means of an electronic regulator. When the polystyrene has thus been weakened it is extruded by the extruder head having a rectangularly profiled slit and circular shaped excavation at both sides. The diameter of these excavations is three times greater than the width of the slit aperture.

The polystyrene film is passed between the rollers, which are heated at 100° C., and which maintain the film in a weakened state. In the chamber built over the apparatus the temperature remains at 100° C. Next, the film is conveyed through a stretching apparatus wherein the edges are slid behind the guide members. By the traction of the rollers, the film is stretched by 300% in transverse and longitudinal directions. The stretched film has a speed of 1 m./min., a thickness of 0.1 mm. and a width of 1150 mm. The temperature of the film is maintained to a constant value by means of a I.R. radiation plate positioned above the film. The temperature of the film is determined by the temperature of this plate and by the film speed. The temperature of the heating plate is controlled by a variable regulator. The stretched film is cooled down to a temperature below the weakening point, between the stretching device and the pull rollers. The main mechanical properties of the film thus obtained are:

Tensile modulus of elasticity in kg./mm.$^2$ _____ 300
Elongation at break in percent_____ 30
Elastic limit in kg./mm.$^2$ _____ 7
Breaking strength in kg./mm.$^2$ _____ 7

*Example 2*

A polysulfonate prepared according to Example 2 of United States patent application Serial No. 797,587, filed March 6, 1959, but having an intrinsic viscosity of 0.5 measured in symmetrical tetrachloroethane, is extruded by a twin-screwed extruder at 200° C. to form a film. The film passes between the rollers which have a constant temperature of 160° C. Next the film is conveyed into the stretching mechanism where it is biaxially stretched to 120% at a temperature of 180° C. The main mechanical properties of the film thus obtained are:

Tensile modulus of elasticity in kg./mm.$^2$ _____ 250
Elongation at break in percent_____ 75
Elastic limit in kg./mm.$^2$ _____ 9.1
Breaking strength kg./mm.$^2$ _____ 11.2

Example 3

A thermoplastic copolyester is prepared from isophthalic acid and terephthalic acid and bisphenol A according to the United States patent application Serial No. 702,252, filed December 12, 1957 and Industrial and Engineer Chemistry, vol. 51, No. 2, February 1959, p. 149, col. 3, lines 13–24. This copolyester has a glass transition temperature of 140° C. and is extruded at 250° C. as described hereinbefore. The guide members of the stretching apparatus are kept in a position parallel to each other and the film is weakened by means of a hot-air current. The speed of the second set of rollers is raised to attain three times the speed of the first set of rollers to obtain a longitudinal stretch of 300%. The speed of the pull rollers is 5 m./min. and the thickness of the finished film is 0.012 mm.

The main mechanical properties of the film are:

Tensile modulus of elasticity in kg./mm.$^2$ _____ 280
Elongation at break in percent _____ 30
Elastic limit in kg./mm.$^2$ _____ 10
Breaking strength kg./mm.$^2$ _____ 20

Example 4

Polyethylene terephthalate with an intrinsic viscosity of 0.8 is extruded by means of a twin-screwed extruder at 300° C.

The temperature of the extruder head, however, is maintained at 260° C., on account of the low melting viscosity of the polymer. The extrusion is effected in a water bath because not only the film but also the edges have to be in an amorphous state before the starting of the stretching process.

The transparent film thus obtained is guided into the stretching apparatus for stretching the film in transverse and longitudinal directions to 300% at a speed of 4 m./min.

The polymer film has following mechanical properties:

Tensile modulus of elasticity in kg./mm.$^2$ _____ 400
Elongation at break in percent _____ 80
Elastic limit in kg./mm.$^2$ _____ 9.5
Breaking strength kg./mm.$^2$ _____ 14

Example 5

A polycarbonate known as "Makrolon E" (a registered trade-mark) manufactured by Bayer is extruded at 280° C. by a twin-screwed extruded to form a film. The film passes between the guide rollers which are maintained at a temperature of 170° C. Next the film is stretched to 300% in both longitudinal and transverse directions at 170° C.

The main mechanical properties of the film thus obtained are:

Tensile modulus of elasticity in kg./mm.$^2$ _____ 280
Elongation at break in percent _____ 40
Elastic limit in kg./mm.$^2$ _____ 9.5
Breaking strength kg./mm.$^2$ _____ 12

I claim:

1. Apparatus for stretching organic thermoplastic films having continuously beaded longitudinal edges, comprising.
    (a) rotating film feed rolls mounted at one end of said apparatus,
    (b) film pulling rollers mounted at the other end of said apparatus, rotating at a peripheral speed at least as great as that of said feed rolls,
    (c) elongate film-edge guide frames mounted between said feed rolls and said pulling rolls and coplanar with the film passing between said rolls, said guide frames diverging laterally from the centerline of said strip in the direction from the feed rolls to the pulling rolls,
    (d) each of said guide frames including vertically spaced, longitudinally continuous wall elements defining between their proximate edges a continuous slot sized to receive an edge of said film with its bead constrained by said wall elements to travel outwardly of said centerline by sliding engagement of the bead with the outer surfaces of said wall elements;
    (e) at least the surfaces of said wall elements which engage said bead being formed of continuous strips of solid material having a low coefficient of sliding friction with respect to the material forming said thermoplastic film.

2. Apparatus in accordance with claim 1, in which said guide frames are pivoted for movement in their common plane about axes near the feed-roll end of said apparatus, and means for adjusting the angular divergence of said frames with respect to said centerline.

3. Apparatus in accordance with claim 1, in which said strips of solid material are composed of polytetrafluorethylene.

4. Apparatus in accordance with claim 1, in which said strips are composed of carbon.

References Cited in the file of this patent

UNITED STATES PATENTS

| 2,342,891 | Powers | Feb. 29, 1944 |
| 2,728,941 | Alles et al. | Jan. 3, 1956 |

FOREIGN PATENTS

| 575,200 | Italy | Apr. 2, 1958 |